DIRECT READING COMPUTER

Filed Nov. 16, 1959 2 Sheets-Sheet 1

Alex Barbosa
INVENTOR.
BY Clarence A. O'Brien
and Harvey B. Jacobson
Attorneys

Fig. 3
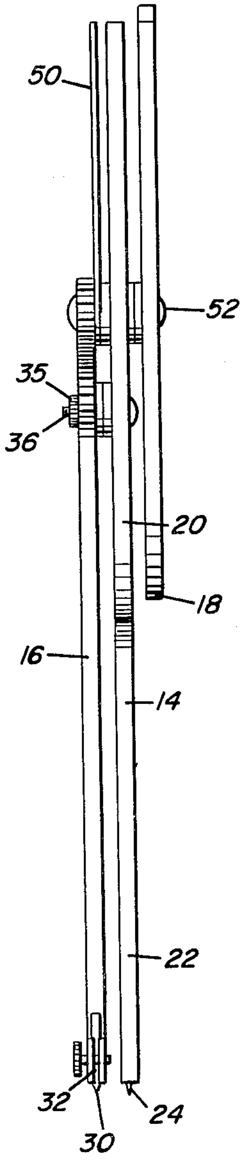
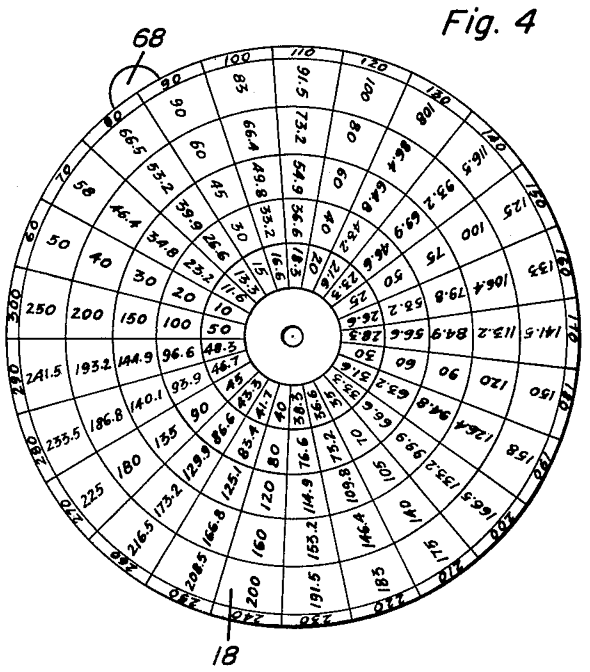
Fig. 5
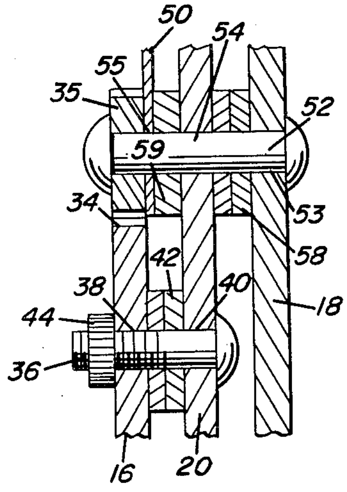
Alex Barbosa
INVENTOR.
BY Clarence A. O'Brien
and Harvey B. Jacobson
Attorneys United States Patent Office 3,045,353

Patented July 24, 1962

3,045,353

DIRECT READING COMPUTER

Alex Barbosa, 1656 Ridge Drive, Redding, Calif.

Filed Nov. 16, 1959, Ser. No. 853,333
5 Claims. (Cl. 33—149)

This invention relates to computers, and more particularly to special purpose, manually operable mechanically simple computers.

An object of the invention is to provide a direct reading speed and distance computer designed primarily for light airplanes and student pilots, and which may be used within a predetermined speed parameter, for example, between 60 and 300 miles per hours.

The simplicity of design and one-hand operation makes the direct reading computer of the invention usable very readily for contact flying.

Briefly, a computer in accordance with this invention provides means by which a pilot flying by visual flight regulations may easily determine ground speed and miles travelled with a minimum of time and effort.

Preferably, the computer is calibrated for statute miles and for five minute time intervals on sectional air charts and for ten minute time intervals on world air charts.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 3 is a side view of the computer as seen from the right side of FIGURE 2.

FIGURE 4 is a front elevational view of the miles-per-hour disk.

FIGURE 5 is an enlarged fragmentary sectional view taken approximately on the line 5—5 of FIGURE 2.

Figures 1, 2:
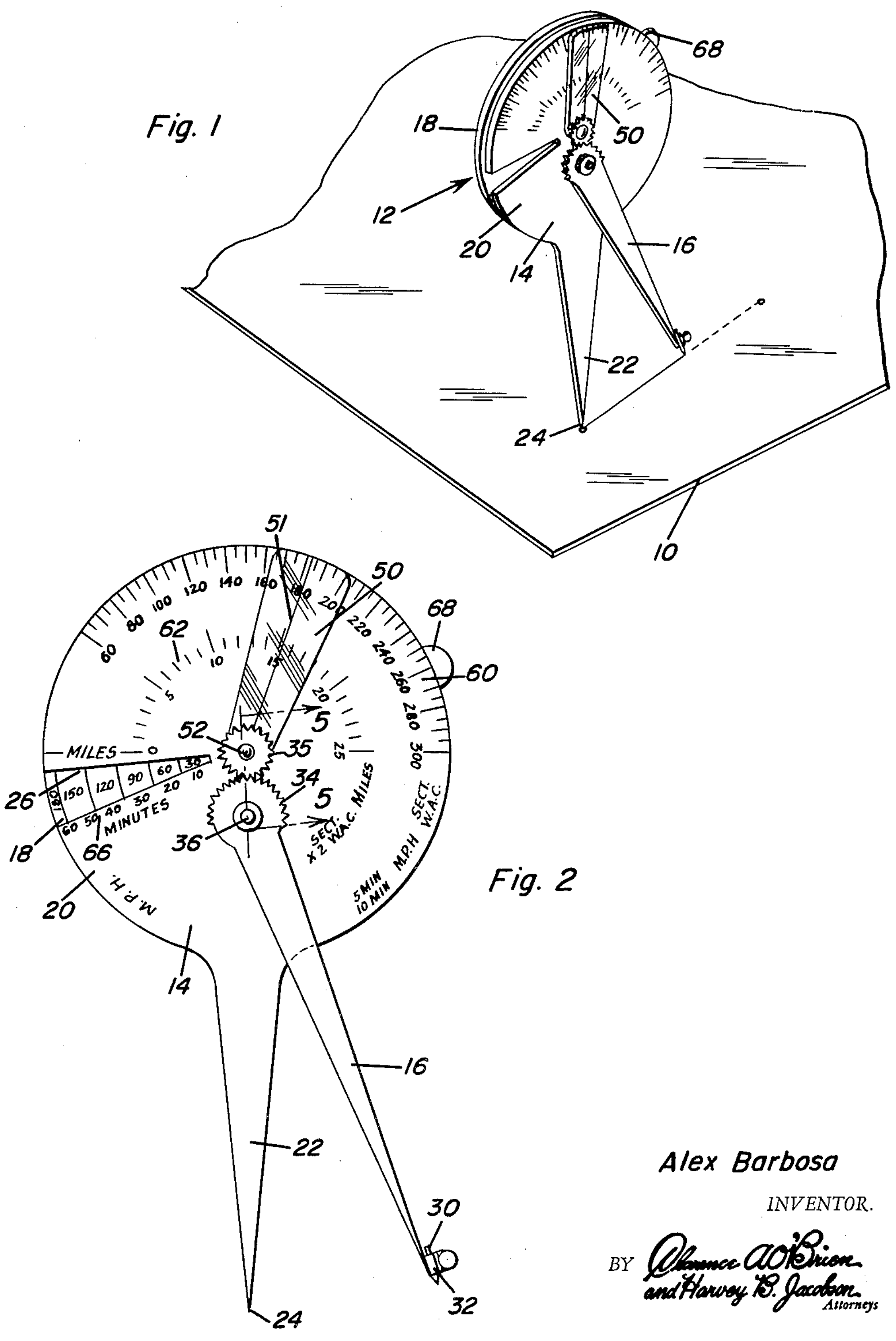
FIGURE 1 is a perspective view of the computer showing it in use.
FIGURE 2 is a front elevational view of the computer.

In the accompanying drawings, FIGURE 1 discloses a chart 10 diagrammatically representing a conventional chart, for instance, a sectional air chart or a world air chart, these being commonly used for air navigation. Computer 12 is quite simple from a mechanical standpoint, being constructed of a main body 14, an arm 16, an indicator blade 50 and a graduated disk 18. Body 14 has a circular part 20 from which arm 22 extends and there is a point or pointed member 24 at the outer extremity of arm 22. A radial, wedge-shaped view slot 26 is provided in the part 20 of body 14 whereby body 14 conceals all of disk 18 except a wedge-shaped portion thereof so that the graduations of disk 18 immediately behind slot 26 are visible.

Arm 16 has a scriber, for instance, lead 30, carried by an adjustable clamp 32 secured to the outer extremity of arm 16. The upper end of arm 16 has a gear 34 made thereon, and the arm is mounted for pivotal movement on pivot pin 36. The pivot pin may be a screw extending through apertures 38 and 40 of arm 16 and body portion 20, respectively. A pair of spacers 42 are mounted on the pivot in between arm 16 and portion 20 of body 14. A nut 44 on the threaded outer end of the pivot 36 may be tightened to temporarily hold arm 16 clamped with body 14.

Gear 34 is enmeshed with gear 35 with which transparent indicator blade 50 is fixed. Spindle 52 extending through apertures 53, 54 and 55 in disk 18, body portion 20 and blade 50 mounts the gear 35 and blade 50 for rotational movement. Spacers 58 and 59 are located between the adjacent parallel members through which the spindle 52 extends.

The graduations on body part 20 and disk 18 are identified in the drawings and will be described more in detail during the description of the operation of the direct reading computer.

After being airborne for five or ten minutes depending on the chart scale, the pilot identifies a landmark (See FIGURE 1) on chart 10, i.e., the pilot's intended flight course, which is five minutes out on a sectional chart or ten minutes out on a world chart from the point of departure. The point 24 is inserted at the point of departure and arm 16 is extended to span the distance to the landmark. Nut 44, a clamp screw or the like, is tightened to maintain the position. When arm 16 is pivoted in the manner described above, blade 50 is also rotated a corresponding distance due to the enmeshed gears 34 and 35. The arm 16 is then swung in the manner of a compass so as to cause the lead 30 to make a mark on the chart to identify the position on the flight course.

The ground speed on scale 60, i.e., the miles-per-hour scale, arranged in an arc on part 20, and the miles travelled on scale 62 which is also arranged in an arc on part 20, can now be read as indicated by the hairline 51 of blade 50. The mileage scale 62 is used to measure the distances on the sectional charts as indicated and is doubled when used on world air charts.

The above procedure is repeated after elapse of another five or ten minutes along the flight course to determine if the first reading is being maintained. If the distance covered is the same, then the ground speed is being maintained. If the distance covered has increased, the ground speed has increased. If the distance is less, the ground speed has decreased. These conditions may be caused by not maintaining constant engine speed or by headwind or tailwind. When such a condition is noted, all that is required of the pilot is to locate new landmarks and time them, and reset the computer to determine the new ground speed, fuel consumption and time of arrival at the point of destination.

In order to estimate the arrival time, the disk 18 is provided. Disk 18 is segmented into 10-mile-per-hour graduations from 60 to 300 miles per hour. This is seen in FIGURE 4 at the periphery of disk 18. Minute scale 66 is graduated in 10 minute intervals along one edge of slot 26 (FIGURE 2) whereby the miles-per-hour disk is readable in conjunction with the minute scale. Actually, the miles-per-hour disk divides the range of 60–300 miles per hour into 10 miles per hour graudations and also divides the miles per hour into 10 minute intervals. Tab 68 on disk 18 is used to rotate disk 18 so that the determined ground speed is nearest to the speed appearing in the viewing slot 26. Any speed not shown on disk 18 can easily be estimated as to time and distance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A direct reading navigational computer for manual one-hand operation in connection with a conventional air navigational chart comprising as components a main body, a chart body, a movable arm and an indicator blade, said main body and said chart body comprising circular plates having cooperating indicia thereon, a first pivot means connecting the axes of said main and chart bodies in spaced parallel relation for relative rotation, said main body having a sectorial view slot extending radially inward from the main body periphery for viewing indicia on said chart body, a stationary arm projecting peripherally from said main body, a second pivot means connecting said movable arm to said main body in spaced relaton thereto and upon the opposite side thereof from said chart body, said indicator blade being pivotally secured to said main body and upon the same side thereof as said movable arm, gearing connecting said indicator blade and said movable arm for simultaneously movement, said fixed and movable arms constituting compass legs, locking means on said second pivot means for securing said arms in pivotally adjusted positions.

2. The combination of claim 1 wherein said components comprise each a flat plate-like member and said circular plates are of substantially the same diameter whereby to cover the indicia on said chart body by said main body except when exposed through said view slot.

3. The combination of claim 1 wherein said gearing comprises a pinion gear fixedly secured to one side of said movable blade and a segmental gear formed by an end portion of said movable arm, said pinion and segmental gears being engaged and lying in a plane parallel to said main body, said indicator blade lying in a plane between that of said gears and said main body.

4. The combination of claim 1 wherein said first pivot means comprises a single pivot pin extending through and securing together said gearing, indicator blade, main body and chart body and spacers on said pivot pin disposed between said main body and each of said indicator blade and chart body.

5. The combination of claim 2 wherein said indicator blade is of transparent material and has an indicator line thereon extending radially from its pivot axis to its outer edge, said outer edge being concentric with said pivot axis and upon the same radius as that of said main body.

References Cited in the file of this patent

UNITED STATES PATENTS

| | | |
|---|---|---|
| 396,479 | Green | Jan. 22, 1899 |
| 634,779 | Tregoning | Oct. 10, 1899 |
| 964,962 | Ford | July 19, 1910 |
| 2,435,606 | Sandowsky | Feb. 10, 1948 |
| 2,551,997 | Cody | May 8, 1951 |

FOREIGN PATENTS

| | | |
|---|---|---|
| 596,543 | Great Britain | Jan. 6, 1948 |